No. 759,855. PATENTED MAY 17, 1904.
G. F. BLACK.
APPARATUS FOR COOLING LIQUIDS.
APPLICATION FILED DEC. 5, 1903.
NO MODEL.

Witnesses.
S. J. Williamson.
G. Ferdinand Vogt.

Inventor.
George F. Black
By
Mann & Co,
Attorney's.

No. 759,855. Patented May 17, 1904.

UNITED STATES PATENT OFFICE.

GEORGE F. BLACK, OF BALTIMORE, MARYLAND.

APPARATUS FOR COOLING LIQUIDS.

SPECIFICATION forming part of Letters Patent No. 759,855, dated May 17, 1904.

Application filed December 5, 1903. Serial No. 183,872. (No model.)

*To all whom it may concern:*

Be it known that I, GEORGE F. BLACK, a citizen of the United States, residing at Baltimore, State of Maryland, have invented certain new and useful Improvements in Apparatus for Cooling Liquids, of which the following is a specification.

My invention relates to improvements in an apparatus for cooling liquids such as beer, and has among its objects to provide a device which may be placed in an ordinary ice-box and surrounded with ice to chill the walls, and thereby cool the liquid.

An object of the invention is to provide a series of triangular-shaped receptacles for the liquid, each receptacle having an inlet and an outlet so arranged with respect to each other as to cause a circulation of the liquid as it passes through the receptacle. The shape of the receptacles is such that when two or more receptacles are coupled together side by side a V-shaped trough or holder will be formed to receive broken ice, which latter is thereby kept in close contact with the walls of the receptacle. As the liquid flows from one receptacle to another the temperature of the liquid is gradually lowered.

The invention is illustrated in the accompanying drawings, in which—

Figure 1:
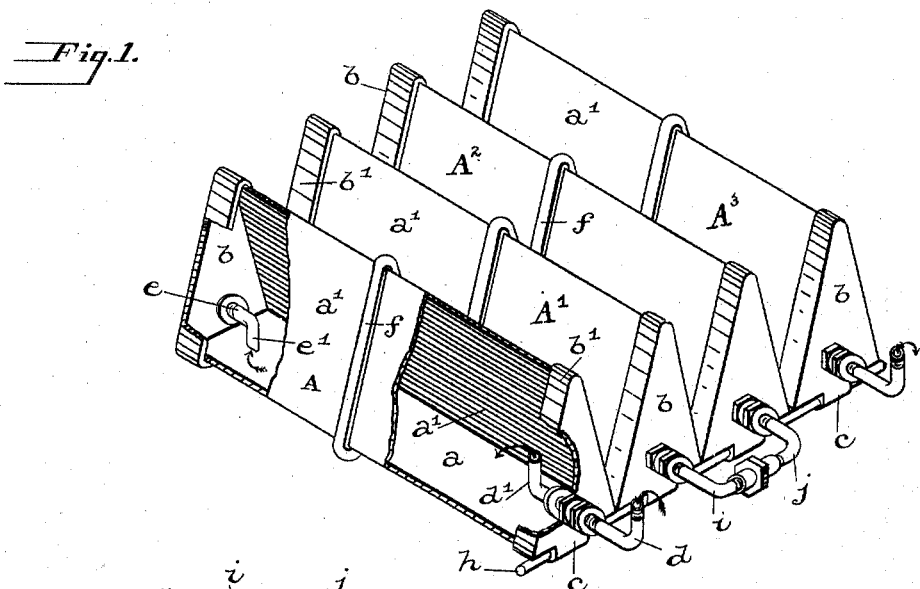
Figure 2:
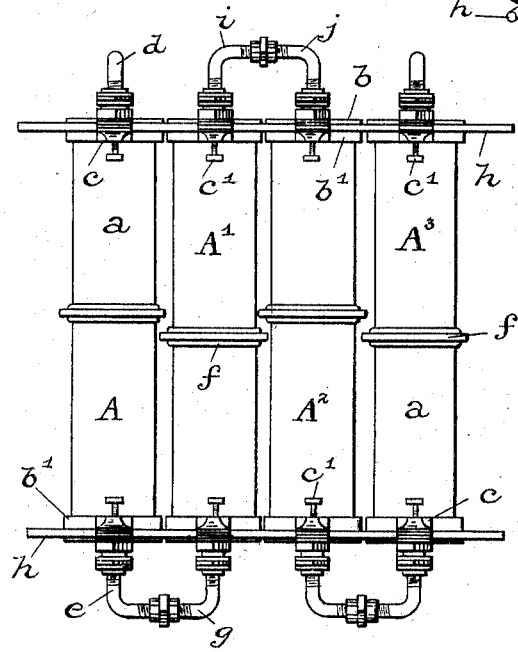
Figure 3:
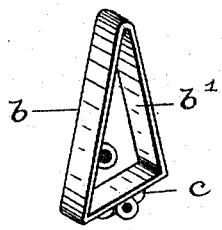

Figure 1 is a perspective view of a series of the receptacles coupled together One of the receptacles is shown partly in section. Fig. 2 is a bottom plan view of same, and Fig. 3 is a perspective detail view of one of the triangular-shaped heads which closes an end of a receptacle.

In the drawings, A, A', A², and A³ designate four receptacles, which are triangular in shape, having a flat bottom $a$, which is the broadest part of the receptacle, and above the bottom are two converging inclined side walls $a'$. Each receptacle is provided at its ends with a triangular-shaped head $b$, which has an inwardly-turned flange $b'$, that forms a socket or cap which snugly fits around the exterior of the three walls of the receptacle. These triangular heads may be secured to the walls of the receptacle in any desired manner to make a liquid and gas tight joint. The bottom side of each head is provided with a boss $c$, having a hole through it for the passage of a rod $h$, and at one side the boss has a set-screw $c'$ to impinge against the rod. The first receptacle A at one end is provided with an inlet-pipe $d$, which on the interior of the receptacle has an upturned discharge end $d'$, and at its opposite end said receptacle is provided with a discharge-pipe $e$, having on the interior a downwardly-projecting end $e'$, which confronts the bottom $a$. A hoop or band $f$ extends entirely around each receptacle between the ends and serves to strengthen the sides and bottom. The discharge-pipe $e$ at the end of the first receptacle A is connected with a pipe $g$, which constitutes the inlet-pipe to the corresponding end of the second receptacle A', and the opposite end of the second receptacle has its outlet-pipe $i$ connected with the inlet-pipe $j$ at the corresponding end of the third receptacle A², and the third and fourth receptacles are connected in like manner, so that every two adjacent receptacles are connected by pipes which in their relation to each other are at diagonally opposite ends of said receptacles. By this arrangement it will be seen that liquid passing through inlet-pipe $d$ will be discharged upwardly into the first receptacle A, and from the latter the liquid will be drawn off near the bottom $a$ through the pipe $e'$ and $e$ and conveyed into the next adjoining receptacle A' and discharged therein through another upwardly-projecting pipe $g$, and so with the others. It will thus be understood that liquid upon entering a receptacle is projected upwardly, but in discharging from said receptacle is drawn from the bottom. The receptacles are placed side by side, as shown, and are secured rigidly in their proper relative positions by the rod $h$, which passes through the bosses $c$ on the bottom of the heads, and the set-screws $c'$ retain them in position. The two rods $h$, one at each end of the series of receptacles, prevent strain on the pipe-joints.

It is obvious that any number of the receptacles may be coupled together—two, three, four, or more.

By this triangular form of receptacles the space between each two adjoining receptacles forms a V-shaped trough or holder for lumps of ice, which as it melts is kept in close contact with the inclined sides of the receptacles, and thus insures the best results.

Having thus fully described my invention, what I claim as new, and desire to secure by Letters Patent, is—

In a liquid-cooling apparatus the combination of a plurality of receptacles arranged side by side in a horizontal plane and each having a flat bottom and upwardly-projecting inclined sides forming a V-shaped ice-space between said receptacles; a pipe connecting each two adjoining receptacles; a boss projecting below the flat bottoms at each end of the receptacles and each boss having a set-screw, and rods extending in a crosswise direction beneath the flat bottom of all the receptacles and secured in said bosses by the set-screws for the purpose set forth.

In testimony whereof I affix my signature in the presence of two witnesses.

GEORGE F. BLACK.

Witnesses:
G. FERDINAND VOGT,
SAMUEL J. WILLIAMSON.